United States Patent [19]
Seel

[11] 4,253,621
[45] Mar. 3, 1981

[54] VEHICLE-SENSITIVE BLOCKING DEVICE

[75] Inventor: Holger Seel, Hamburg, Fed. Rep. of Germany

[73] Assignee: Autoflug GmbH, Rellingen, Fed. Rep. of Germany

[21] Appl. No.: 4,267

[22] Filed: Jan. 17, 1979

[30] Foreign Application Priority Data

Jan. 18, 1978 [DE] Fed. Rep. of Germany ....... 2802030

[51] Int. Cl.³ .................... A62B 35/02; B65H 75/48
[52] U.S. Cl. ............................. 242/107.4 A
[58] Field of Search ............... 242/107.4 R–107.4 E; 280/806–808; 297/476–480

[56] References Cited
U.S. PATENT DOCUMENTS

| 3,838,831 | 10/1974 | Bell | 242/107.4 A |
| 4,065,069 | 12/1977 | Weman | 242/107.4 A |

FOREIGN PATENT DOCUMENTS 2425049 12/1974 Fed. Rep. of Germany ... 242/107.4 A

Primary Examiner—John M. Jillions
Attorney, Agent, or Firm—Becker & Becker, Inc.

[57] ABSTRACT

A vehicle-inertia-sensitive blocking device for automatic belt reeling mechanisms for motor vehicle safety belts. The device has an inertia sensor and a thereby pivoted pawl, which is pivotally mounted on a carrier and has a stop for engaging a counterpart or cogwheel having corresponding toothing. The pawl or the carrier has indentation or notch means that form a rated breaking point, and optionally, the pawl has a further stop in the region of the rated breaking point on the remaining portion of the pawl. Mechanism is provided for holding one of the stops remaining on the pawl in blocking engagement with the cogwheel.

10 Claims, 19 Drawing Figures

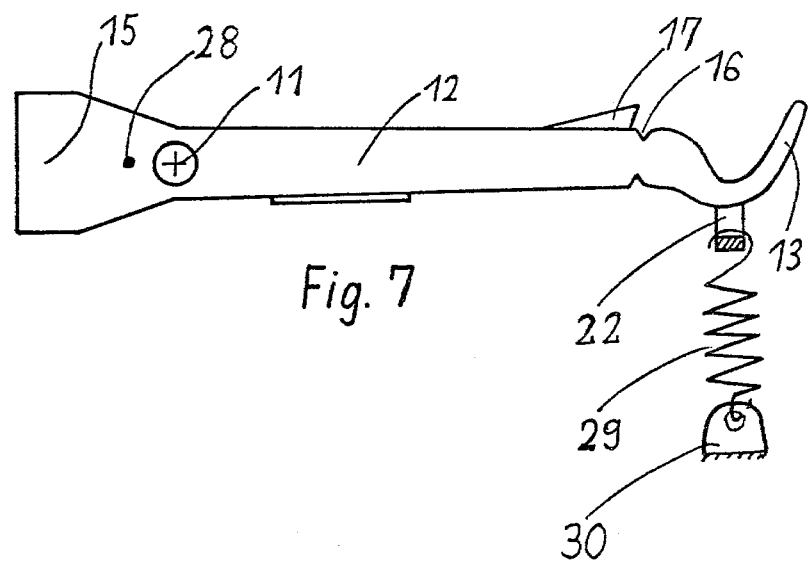
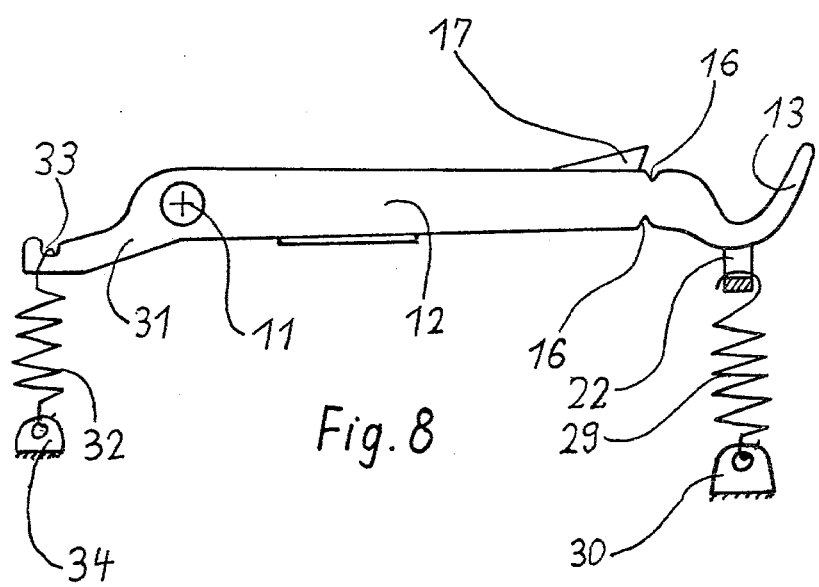

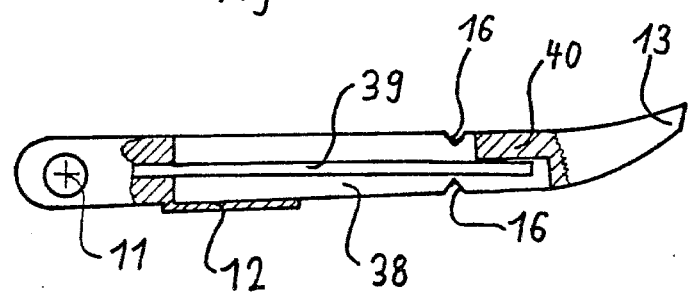
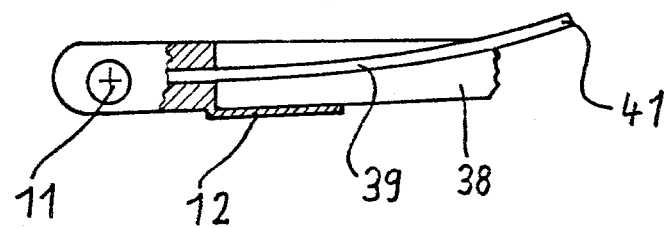
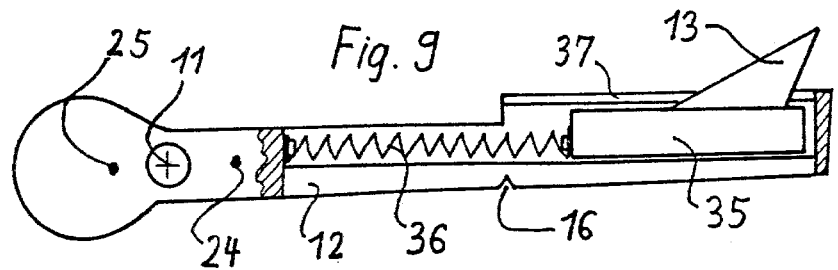

VEHICLE-SENSITIVE BLOCKING DEVICE

The present invention relates to a vehicle-sensitive blocking device for automatic belt reeling mechanisms of motor vehicle safety belts. The device has an inertia sensor and a thereby pivoted pawl, which is pivotably mounted on a carrier and has a stop for engaging a counterpart having corresponding toothing.

Automatic belt reeling mechanisms generally have two systems, with which the unreeling movement of the belt can be blocked, namely, a so-called belt-sensitive system which responds to a pull-off acceleration of the belt, and a vehicle-inertia-sensitive system which responds to accelerations of the vehicle. With certain accelerations of the vehicle, the inertia sensor which can be a ball, a pendulum, or the like, is displaced out of a definite position of rest and, in so doing, pivots the pawl in the direction of the toothing of the counterpart, until a stop attached to the tip of the pawl engages the toothing of the counterpart and blocks the (further) pulling-out of the belt. The pawl, its stop, the toothing of the counterpart, and their mutual arrangement are designed in such a way that the elements causing blocking are brought into engagement in a relatively exact and controlled manner.

Since the elements causing blocking are relatively small and light structural parts, stresses, deformations, or destruction cannot always be prevented if a strong construction is not provided or if the construction is defective. In particular, the stop or the end of the pawl with the stop may break off from the pawl. The remaining part of the pawl, as a rule, is no longer of sufficient length to engage with the cogwheel. The vehicle inertia-sensitive system then fails completely. However, if only a small piece of the stop or of the end of the pawl breaks off, and the pawl is still long enough to be able to serve, with its end, as a stop for the toothing of the counterpart, the "cogwheel", then the elements causing blocking come into engagement in an uncontrolled manner.

To prevent overloads, it has already been proposed to displaceably mount the entire pawl in a carrier against the action of a spring, in order thereby to prevent damage of the structural parts due to excessive stresses (German Offenlegungsschrift No. 2 405 460). This, however, does not exclude parts of the pawl or primarily its stop from being damaged or broken off, so that the result is, again, the complete failure of the vehicle-sensitive system.

It is also known, in addition to the pawl, to provide an auxiliary pawl which is brought into engagement with the cogwheel by the inertia sensor, thereby again bringing the pawl into engagement with the teeth of the cogwheel. It is intended herewith to solve the problem of preventing the pawl from being caught on the tip of one of the teeth of the cogwheel and being disengaged again under a strong load (German Offenlegungsschrift No. 2 537 453). However, the system is rendered inoperative when the pawl breaks off. A similar problem is described in GB Pat. No. 1 439 897. However, again no indication is to be found therein as to what can be done if the pawl breaks off, in order to prevent complete failure of the vehicle-sensitive system of the belt reeling mechanism.

Finally, FR Pat. No. 2 297 062, also provides by means of a feeler only a solution to the problem of causing the pawl to engage completely with the next tooth of the cogwheel, without making provision for the case of a break of the pawl.

It is therefore an object of the present invention to prevent complete failure and faulty blocking of a vehicle-sensitive blocking device of the above mentioned type, that is, to make the construction "fail safe".

This object, and other objects and advantages of the present invention, will appear more clearly from the following specification in connection with the accompanying drawings, in which:

FIGS. 7 to 14 show further forms of construction of pawls for the blocking device of FIG. 1;

Figure 1:
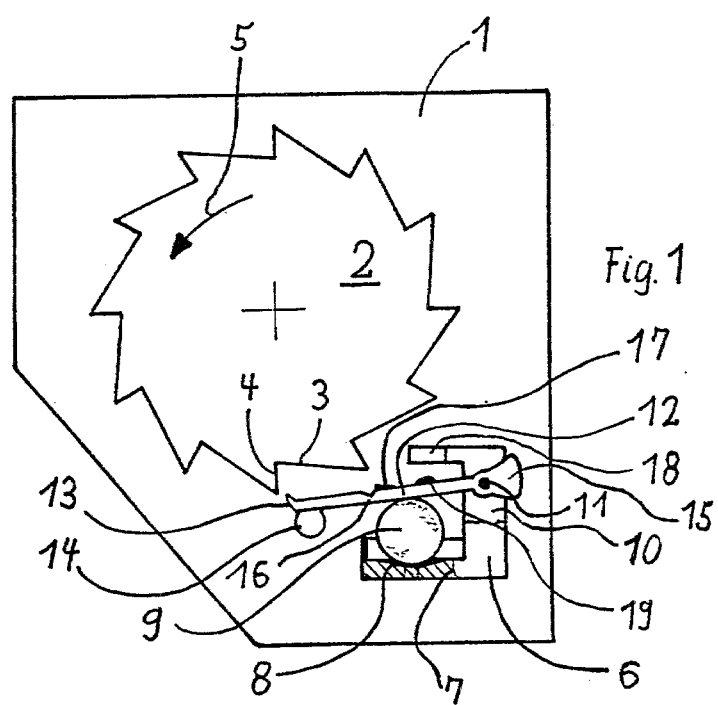
FIG. 1 is a schematic view of a vehicle-sensitive blocking device.

The blocking device of the present invention is characterized primarily in that the pawl or the carrier has a rated breaking point, in that optionally the pawl has a further stop in the region of the rated breaking point on the remaining portion of the pawl, and in that means are provided for holding one of the stops remaining on the pawl in engagement with the cogwheel.

An important advantage of the invention is that the vehicle-sensitive blocking device behaves in a definite manner even after a load which leads to the break of a part essential to operation, because the pawl or the carrier break at the rated breaking point during overload at a predetermined point. The position of the second stop is likewise structurally predetermined, so that, as before, the elements causing blocking in each case come into engagement in an exactly controlled manner. Due to the fact that after a break the pawl remains permanently deflected or the elements causing blocking are held in engagement, it is ensured that the belt cannot be pulled out further. Consequently, after a break the belt user may still use his belt as a static belt which, however, when the belt is taken off, is reeled up by the automatic belt reeling mechanism and can then no longer be pulled out. Since the belt can no longer be used, at least the belt reeling mechanism must be replaced.

With the blocking device of the present invention, a series of forms of construction is possible, provided that it is ensured that in normal operation the pawl interacts in a conventional way with the inertia sensor, that is, the pawl opposes a comparatively small resistance to the movements of the inertia sensor due to vehicle accelerations, and can execute without obstruction the pivoting movements caused by the action of the inertia sensor on the pawl. In order to hold the remaining part of the pawl in engagement with the cogwheel after a break, weight forces, elastic forces, magnetic forces, or forces resulting from form locking may be utilized. These forces are respectively released in a definite manner after a break or after overloading.

Referring now to the drawings in detail, like reference numerals designate like parts. The vehicle-sensitive blocking device is attached to one side of the housing 1 of an automatic belt reeling mechanism (not shown). On a belt shaft (not shown), projecting beyond the side wall of the housing 1, is located a cogwheel 2 which is an inertial mass for the belt-sensitive system and simultaneously a control element for the vehicle-sensitive system. The cogwheel 2 controls the blocking element (not shown). In the embodiment shown in FIGS. 1 to 4, the cogwheel 2 has teeth with flat tooth flanks 3, which extend substantially in a circumferential direction, and with steep tooth flanks 4, which extend substantially in a radial direction. When the belt is pulled out, the cogwheel 2 turns in the direction of the arrow 5.

In the embodiment of FIGS. 1 to 4, a U-shaped support or carrier 6 is likewise attached to the side wall of the housing 1. The lower U-leg 7 of the carrier 6 is shaped on the inside to form a cup 8 on which a ball 9, which serves as an inertia sensor, is movably held. On the U-crosspiece 10 of the U-shaped carrier 6 is situated a pivot 11 for a pawl 12, which rests lightly on the ball 9. The pawl 12 carries at its front end as a stop an angled tip 13 which, as explained further hereinafter, interacts with one of the steep tooth flanks 4 on the cogwheel 2.

Figure 2:
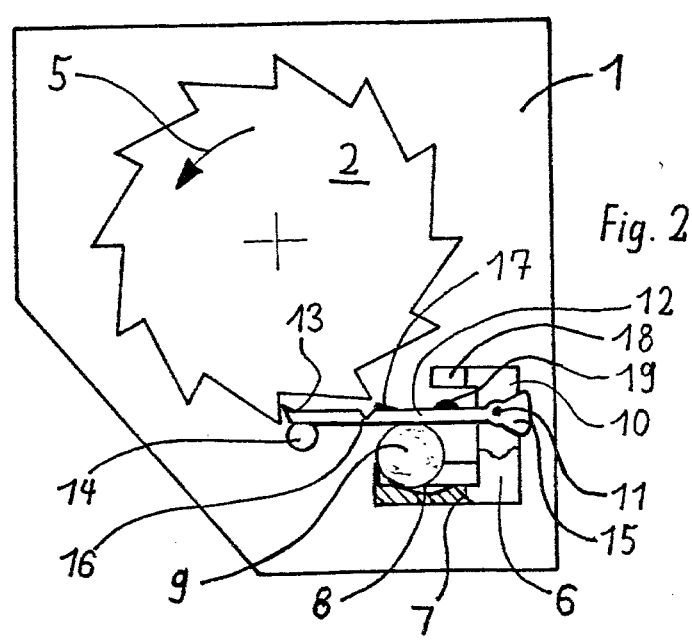
FIG. 2 shows the blocking device of FIG. 1 in another functional position.
Figure 3:
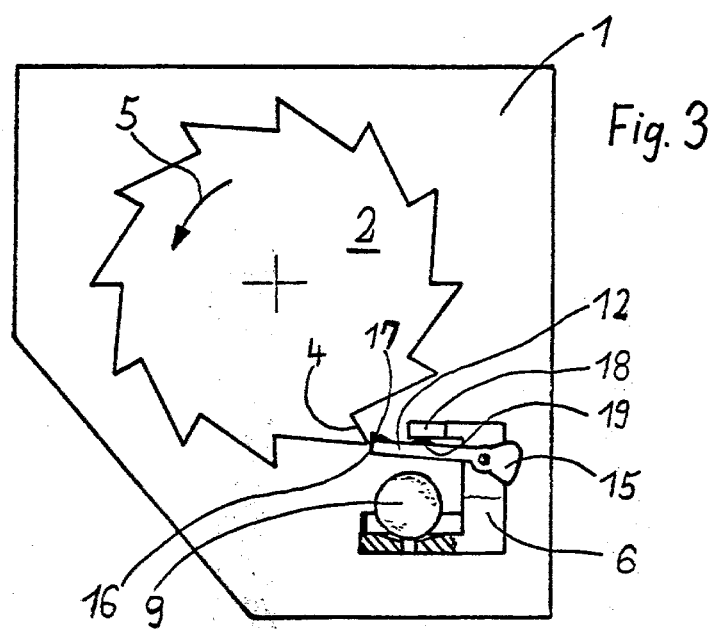
FIGS. 3 and 4 show two functional positions of the blocking device of FIG. 1, after the stop of the pawl has broken off.
Figure 4:
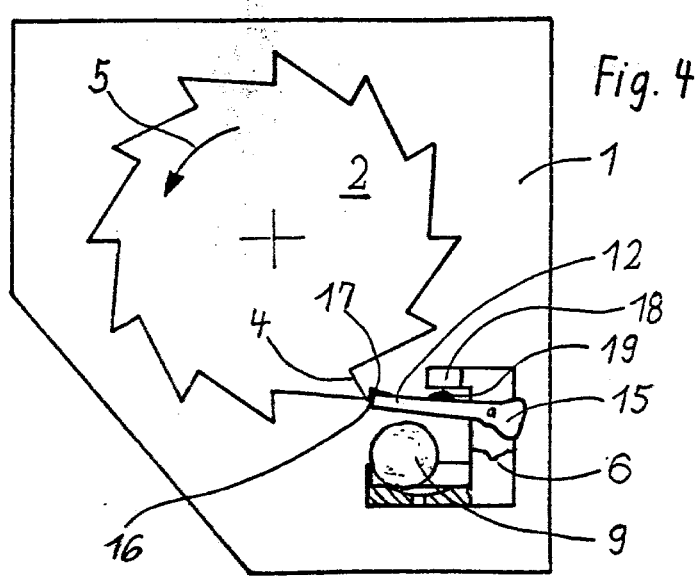

Further, in the embodiment shown in FIGS. 1 to 4, there are molded on the underside of the pawl 12 in the region of the tip 13 a weight means or weight 14, and on that side of the pivot 11 which lies opposite the tip 13 a further weight 15. The weight means or weights 14, 15 are coordinated with the remaining weight distribution of the pawl 12 in such a way that after a break, the pawl 12 experiences, at a rated breaking point formed by notches or indentations 16, a torque which results from weight forces and which brings the remaining part of the pawl 12 into the region of engagement with the cogwheel 2 (FIGS. 3,4). To guarantee a proper engagement between the pawl 12 and the cogwheel 2, the pawl 12 has, on the remaining part immediately next to the indentations 16, a further tip 17 which serves as a stop. Finally, on that side of the pawl 12 facing the upper U-leg 18 of the U-shaped carrier 6, there is situated a lens-like projection 19 which interacts as a stop with the inside of the U-leg 18 and limits the pivoting movement of the broken pawl 12.

FIGS. 1 and 2 illustrate the normal operating condition of the vehicle-sensitive blocking device. FIG. 1 shows the operating state in which no noteworthy vehicle accelerations occur. The ball 9 is situated in the position of rest defined by the shape of the cup 8. The pawl 12 together with the tip 13 is situated beyond the region of engagement with the cogwheel 2. When a vehicle acceleration lying in the range of response of the blocking device occurs, the ball 9 migrates, as shown in FIG. 2, out of its definite position of rest and, in so doing, pivots the pawl 12 together with the tip 13 into the region of engagement of the cogwheel 2 which can thereby no longer execute a turning movement in the direction of the arrow 5.

FIGS. 3 and 4 illustrate the situation which arises when after an overload, the end of the pawl 12 having the tip 13 and the weight 14, is broken off at the rated breaking point defined by the indentations 16. Under the effect of the weight 15, the pawl 12 pivots into the position shown, where the projection 19 rests on the inside of the U-leg 18 of the U-shaped carrier 6. In so doing, the tip 17 is situated in the region of engagement with the cogwheel 2, and reliably detains the latter, as shown. Further vehicle accelerations, which lead to a deflection of the ball 9 out of its position of rest (FIG. 4), have no effect on the blocking of the cogwheel 2. Although the cogwheel 2 may be turned against the direction of the arrow 5, whereby the belt is wound onto the belt shaft, by the action of a spring (not shown), there is no possibility of pulling the belt off from the shaft again.

Figure 5:
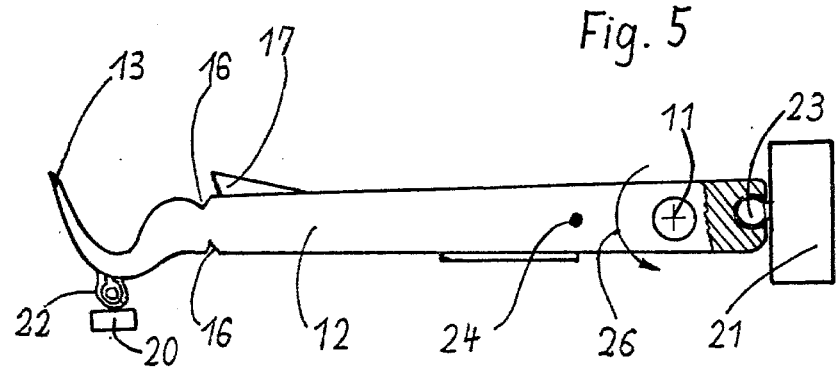
FIG. 5 is an enlarged view of another form of construction of a pawl for the blocking device of FIG. 1.
Figure 6:
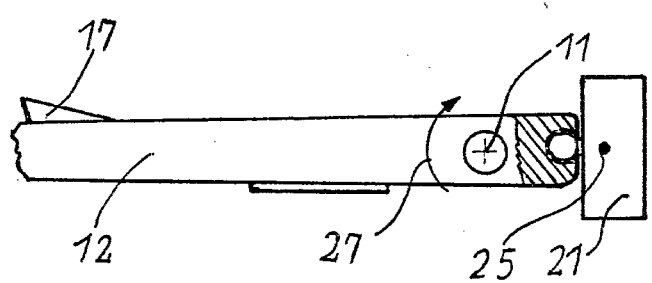
FIG. 6 shows the pawl of FIG. 5 after an overload.

FIG. 5 shows a pawl 12 where, instead of weights molded on in one piece, additional weight means in the form of additional weights 20, 21 having a higher specific gravity are provided at the ends. The additional weight 20 is clipped into an eyelet 22 in the region of the front tip 13, while the additional weight 21 is connected to a plug-in or stop connection 23 on the pawl 12 on that side of the pivot 11 which is remote from the tip 13. A comparison of FIGS. 5 and 6 reveals that the center of gravity 24 of the undamaged ball 12 lies between the tip 13 and the pivot 11, while after a break of the tip 13 in the region of the identations or notch means 16, the center of gravity 24 lies on the other side of the pivot 11 in the region of the additional weight 21. Correspondingly, a pushingdown moment 26 acts upon the undamaged pawl 12 of FIG. 5, and a pushing-up moment 27 acts upon the broken pawl of FIG. 6.

The pawl 12 shown in FIG. 7 has such a weight distribution that its center of gravity 28 is disposed on that side of the pivot 11 lying opposite the tip 13. To compensate the pushing-up moment thereby obtained, a tension spring 29 is suspended in the eyelet 22 in the region of the tip 13. The other side of the tension spring 29 is mounted at 30 on the carrier 6 or on the side wall of the housing 1. The weight distribution and elastic force are adjusted to one another in such a way that the action of the ball 9, which serves as the inertia sensor, is not affected. Upon a break of the pawl 12 in the region of the indentation 16, the action of the spring 29 is nullified, and the pushing-up moment becomes effective due to dead weight.

The pawl 12 shown in FIG. 8 is designed as a two-armed lever in which the arm 31, which is remote from the tip 13, is also acted upon by a tension spring 32, one end of which is suspended in a notch 33 of the arm 31, and the other end of which is suspended in an eyelet 34 of the carrier 6 or of the housing 1. The elastic or spring forces are again set up in such a way as to exclude impairment of the action of the ball 9. Upon a break of the pawl 12 in the region of the indentation 16, the action of the spring 29 is nullified, so that the spring 32 can apply a pushing-up moment to the remaining part of the pawl 12.

FIG. 9 shows that the tip 13 of the pawl 12 may be fastened to a slide 35 which is displaceable against the action of a spring 36 in a guide 37, which extends over a part of the length of the pawl 12 and has a slot for the tip 13. An indentation 16 serves as a rated breaking point at which the end of the pawl 12, which is provided with the guide 37, breaks off, as a result of which the center of gravity then migrates from 24 to 25. This form of construction functions perfectly in conjunction with the above described features even if the spring 36 breaks or falls out.

Figure 12:
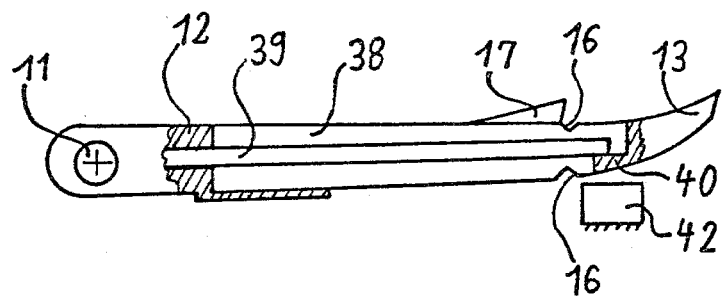
Figure 13:
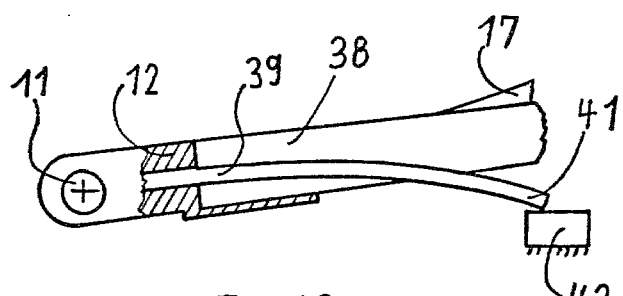

The pawls 12 shown in FIGS. 10 to 13 have a continuous slot 38 which forms a continuous opening in the pawl in the pivoting direction. A leaf spring 39 is clamped into the material of the pawl 12 on the side of the pivot 11. The leaf spring 39 is prestressed and its other end is braced on an abutment 40 outside the rated breaking point formed by the indentations 16. In the embodiment of FIGS. 10 and 11, the leaf spring 39 is prestressed in such a way that after the tip 13 together with the abutment 40 has broken off it curves in the direction of the cogwheel 2, whereupon its end 41 forms the stop for blocking the cogwheel 2. In the embodiment of FIGS. 12 and 13, the leaf spring 39 is prestressed in the opposite direction. After the tip 13 together with the abutment 40 has broken off, the leaf spring 39 is relieved, whereupon its end 41 braces itself on an abutment 42 of the carrier 6 or of the housing 1. In so doing, the leaf spring 39 applies a pushing-up moment on the remaining part of the pawl 12 which, in this case, again has the additional tip 17, which then pivots into the region of engagement of the cogwheel 2.

Figure 14:
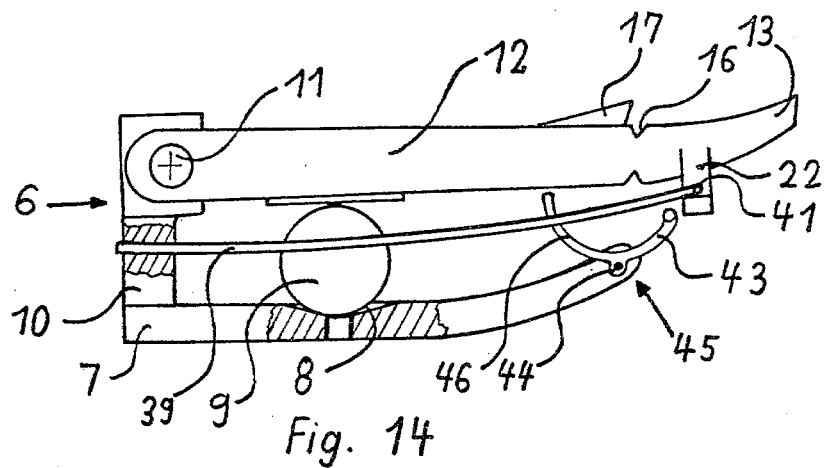

The pawl 12 shown in FIG. 14 functions analogously to the pawl shown in FIGS. 12 and 13. With this embodiment, the pawl 12 is designed as a one-armed lever on which the eyelet 22 is molded in the region of the tip 13. The free end of the leaf spring 39, which is clamped in the U-crosspiece 10 of the U-shaped carrier 6, engages in this eyelet 22. In the functional position shown, the leaf spring 39 is prestressed in such a way that it holds the pawl 12 on the ball 9. When the end having the tip 13 and the eyelet 22 breaks off, the leaf spring 39 is relieved and its end 41 acts upon one arm 43 of a counterpoise (Rippe) 45 which is mounted at 44 on the extended U-leg 7 of the U-shaped carrier 6. The counterpoise 45 then turns about its pivot 44, so that the other arm 46 can engage the underside of the pawl 12 and push it up until the not broken off tip 17 enters the region of engagement of the cogwheel 2.

Figure 15:
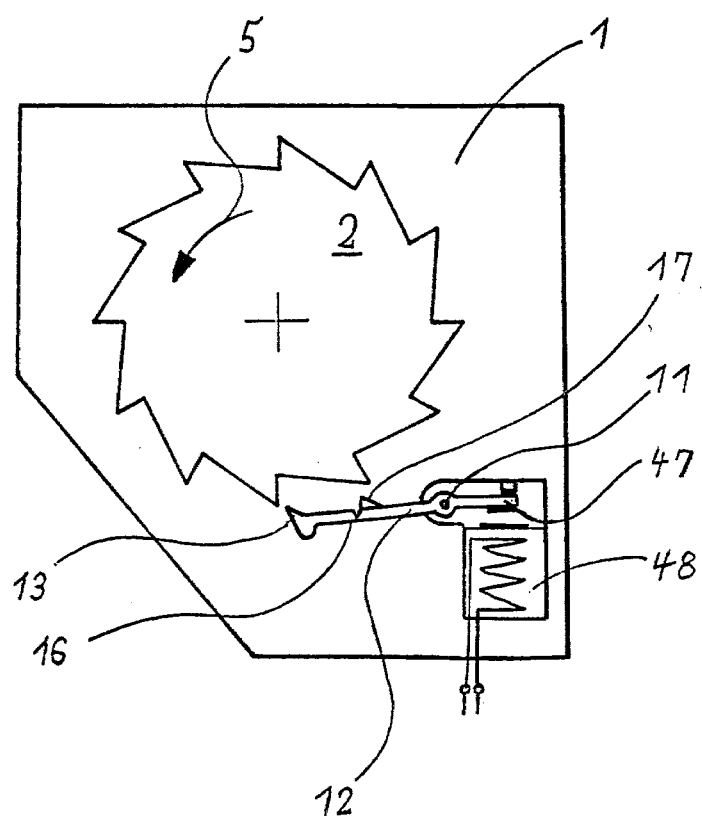
FIG. 15 shows another form of construction of the blocking device of FIG. 1.

FIG. 15 illustrates that the various forms of construction of the vehicle-inertia-sensitive blocking device are capable of operating continuously even when a central vehicle-inertia-sensitive system controlling the blocking of the individual belt reeling mechanisms is utilized. In the embodiment shown in FIG. 15, the pawl 12 is a two-armed lever which has an armature 47 on that side of the pivot 11 opposite the tip 13. The armature 47 is disposed in the effective range of an electromagnet 48 which is controlled by the central system. In addition, the pawl 12 has one of the above described arrangements with which, after a break in the region of the indentations 16, the tip 17 located on the remaining part of the pawl is pivoted into the region of engagement of the cogwheel 2 and is held therein.

Figure 16:
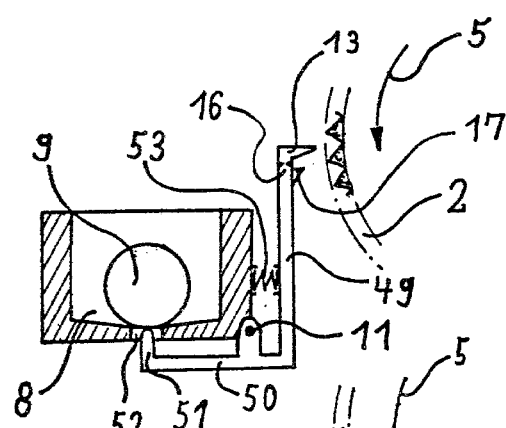
FIGS. 16 to 18 show a further form of construction of a part of the blocking device of FIG. 1.
Figure 17:
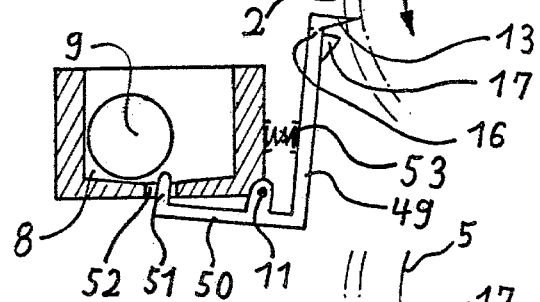
Figure 18:
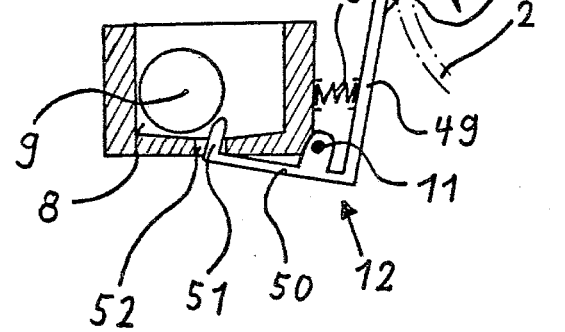

FIGS. 16 to 18 show different functional positions of one form of construction in which the pawl 12 is an angle lever, one arm 49 of which supports the tip 13, the indentations 16 serving as a rated breaking point, and the further tip 17, while the other arm 50 has a projection 51 which, through an opening 52 defining the position of rest of the ball 9, reaches in the bottom of the cup 8. The arm 49 is braced on the housing of the cup 8 between the indentations 16 and the pivot 11, by a compression spring 53, so that the pawl 12 seeks, due to its being pushed up, to come into engagement with the cogwheel 2. However, it is prevented from doing so by the ball 9 which, in the position of rest (FIG. 16) counteracts the elastic force of the spring 53 and holds the tip 13 of the pawl 12 away from the cogwheel 2. Upon deflection of the ball 9, the elastic force becomes effective (FIG. 17) and the tip 13 engages the cogwheel 2. In so doing, however, the projection 51 extends into the cup 8 only so far that it can be pushed back again against the action of the spring 53 by the ball 9 when the latter returns to its position of rest. When the tip 13 is broken off, the pawl 12 can pivot through a larger angle (FIG. 18). The projection 51 then extends into the cup 8 so far that it holds the ball 9 in the deflected position in a positive manner. The blocking of the cogwheel 2 can then no longer be released.

Figure 19:
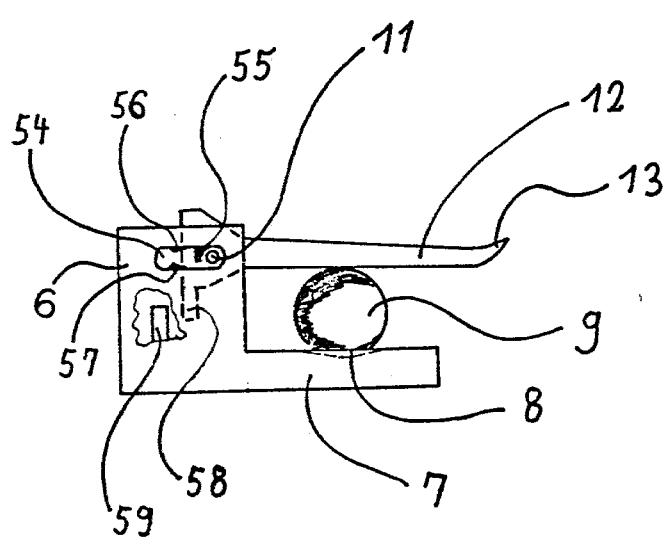
FIG. 19 shows a further form of construction of a part of the blocking device of FIG. 1.

In the embodiment shown in FIG. 19, the rated breaking point is no longer situated on the pawl 12, but rather in the region of its pivot on the carrier 6. The pivot 11 of the pawl 12 is held in a slot 54 and is fixed therein by a clip or a catch 55. Upon over-loading, the pawl 12 together with its pivot 11 is displaced in the slot 54 and, in so doing, overruns the catch 55 as well as two further clip-shaped catches 56, 57 which are disposed in the slot 54 and fix or hold the pivot 11 at the other end of the slot 54. The catches 55 to 57 can only be overrun by the pivot 11 in one direction. In this embodiment, the pawl 12 is again designed as an angle lever, the angled arm 58 of which strikes an abutment 59 held on the carrier 6 during displacement of the pawl 12 in the slot 54, so that the pawl 12 is pushed up in the above-described manner, and its tip 13 is brought into the region of engagement of the cogwheel 2 and is held therein.

The present invention is, of course, in no way restricted to the specific disclosure of the specification and drawings, but also encompasses any modifications within the scope of the appended claims. The features disclosed may be used individually as well as in any desired combination.

What I claim is:

1. A vehicle-sensitive device for automatic belt reeling mechanisms of motor vehicle safety belts, which device comprises:

a housing;
   a belt reel rotatably journalled to said housing and a toothed cogwheel connected to said reel for rotation therewith;
   a carrier attached to said housing;
   an inertia sensor displaceably held on said carrier;
   a pawl pivotally mounted on said carrier and pivotable by movement of said inertia sensor, said pawl having notch means as a rated breaking point so that said pawl can exist in an undamaged state, and in a broken state in which that end of said pawl beyond said rated breaking point and remote from said pivot point is broken off;
   a first stop, for engaging said cogwheel, located on that end of said pawl remote from the pivot point of said pawl and beyond said rated breaking point;
   a second stop forming a part of said pawl and located near said rated breaking point on that part of said pawl remaining in said broken state, said second stop being engageable with said cogwheel; and
   means for holding said second stop in engagement with said cogwheel for blocking reel unwinding rotation.

2. A blocking device according to claim 1, in which said notch means is formed by at least one notch.

3. A blocking device according to claim 1, in which said pawl is a two-armed pivotable lever which serves as said means for holding said second stop in engagement with said cogwheel and has a weight distribution the center of gravity of which is situated between said pivot point and said first stop in the undamaged state of said pawl and on that side of said pivot point opposite said first stop in the broken state of said pawl.

4. A blocking device according to claim 3, which includes an additional weight means connected on the ends of said two-armed pivotable lever for adjusting weight distribution forces.

5. A blocking device according to claim 1, in which said pawl is a two-armed pivotable lever which serves as said means for holding said second stop in engagement with said cogwheel and has a center of gravity situated on that side of said pivot point opposite said second stop, said device including spring means attached to said first stop for holding said two-armed pivotable lever in an engagement position in its undamaged state.

6. A blocking device according to claim 1, in which said pawl is a two-armed pivotable lever, said device including a first spring means mounted on said carrier and connected to said first stop for holding said pivotable lever in an unengaged position in its unbroken state, and a second spring means mounted on said carrier and connected to the end of said two armed lever remote from said first stop, said second spring means serving as said holding means.

7. A blocking device according to claim 5 or 6, in which said spring means are tension springs.

8. A blocking device according to claim 1, in which said pawl is a one-armed pivotable lever and includes an abutment means and a prestressed leaf spring having one end braced on said first abutment means, and in which the other end of said leaf spring is clamped in said lever and, in the broken state, that end of said leaf spring which was braced on said first abutment means in the undamaged state forms said second stop said leaf spring curving toward engagement with said cogwheel and thus serving as said holding means.

9. A blocking device according to claim 1, in which said pawl is a one-armed pivotable lever and includes a first abutment means and a prestressed leaf spring serving as said holding means said leaf spring having one end braced on said first abutment means and, in which the other end of said leaf spring is clamped in said lever, said device including a second abutment means, mounted on said carrier, for bracing, in the broken state, that end of said leaf spring which was braced on said first abutment means in the undamaged state, thereby holding said second stop of said pivotable lever in blocking engagement with said cogwheel.

10. A blocking device according to claim 1, in which said pawl is a one-armed pivotable lever and includes an abutment means, a pre-stressed leaf spring having one end braced on said abutment means and, in which the other end of said leaf spring is clamped in said carrier, and said holding means comprising a counterpoise mounted on said carrier in the region of said rated breaking point, said counterpoise in the broken state of said pawl being loaded by said leaf spring and holding said second stop in blocking engagement with said cogwheel.

* * * * *